United States Patent
Liao

(10) Patent No.: US 7,082,867 B2
(45) Date of Patent: Aug. 1, 2006

(54) CIRCULAR SAW WITH A DUST COLLECTING MECHANISM

(76) Inventor: Juei-Seng Liao, 396, Yung-Ming St., Ta-Li, Taichung Hsien (TW)

( * ) Notice: Subject to any disclaimer, the term of this patent is extended or adjusted under 35 U.S.C. 154(b) by 260 days.

(21) Appl. No.: 10/783,321

(22) Filed: Feb. 20, 2004

(65) Prior Publication Data

US 2005/0092150 A1    May 5, 2005

(30) Foreign Application Priority Data

Oct. 30, 2003  (TW) .............................. 92219291 U

(51) Int. Cl.
*B26D 7/18* (2006.01)
*B27B 5/29* (2006.01)
*B27G 19/04* (2006.01)

(52) U.S. Cl. .............................. 83/100; 83/98; 83/478; 83/490; 144/252.1; 241/101.2; 451/456

(58) Field of Classification Search .................... 83/98, 83/99, 100, 478, 490; 29/DIG. 78, DIG. 83; 144/252.1, 252.2; 241/101.2; 451/451, 451/453, 456

See application file for complete search history.

(56) References Cited

U.S. PATENT DOCUMENTS

| | | | | |
|---|---|---|---|---|
| 1,013,534 A | * | 1/1912 | Cheney | ....................... 451/353 |
| 1,983,277 A | * | 12/1934 | Emmons | ...................... 451/359 |
| RE20,687 E | * | 4/1938 | Grozier | ........................ 83/100 |
| 2,236,232 A | * | 3/1941 | Brescka et al. | ............. 451/453 |
| 3,669,163 A | * | 6/1972 | Crane | ........................... 30/380 |
| 6,772,664 B1 | * | 8/2004 | Chiang | ......................... 83/100 |
| 6,837,134 B1 | * | 1/2005 | Chin-Chin | ................... 83/100 |
| 6,866,568 B1 | * | 3/2005 | Liao | ............................. 451/69 |
| 6,925,919 B1 | * | 8/2005 | Liao et al. | ..................... 83/168 |
| 6,948,412 B1 | * | 9/2005 | Brazell et al. | ................ 83/100 |

* cited by examiner

Primary Examiner—Clark F. Dexter
(74) Attorney, Agent, or Firm—DLA Piper Rudnick Gray Cary US LLP

(57) ABSTRACT

A circular saw includes a worktable, a blade supporting unit pivotally mounted to the worktable, a saw blade shaft mounted rotatably on the supporting unit and driven by a motor to rotate a saw blade, a driving shaft mounted rotatably on the supporting unit, and a dust collecting member confining a dust passageway which has an intake port in the vicinity of the saw blade, and an outlet port for passage of wood dust. A blower casing is disposed outwardly of the supporting unit, and defines an accommodation chamber disposed downstream of the outlet port and receiving a driving end of the driving shaft. An impeller is mounted on the driving end and is rotatable so as to draw wood dust from the dust passageway into the accommodation chamber and out through a discharge port.

7 Claims, 8 Drawing Sheets

US 7,082,867 B2

CIRCULAR SAW WITH A DUST COLLECTING MECHANISM

CROSS-REFERENCE TO RELATED APPLICATION

This application claims priority of Taiwanese Application No. 092219291, filed on Oct. 30, 2003.

BACKGROUND OF THE INVENTION

1. Field of the Invention

This invention relates to a circular saw, more particularly to a circular saw with a dust collecting mechanism which is driven by a motor of the circular saw.

2. Description of the Related Art

Referring to FIG. 1, a conventional circular saw 10 is shown to include a worktable 11, a mounting seat 12 mounted on a rear end of the worktable 11, a blade supporting frame 14 pivotally mounted on the mounting seat 12 by a pivot member 13 at a pivot end such that an opposite free end is turnable toward and away from the worktable 11, a circular saw blade 15 mounted rotatably on the blade supporting frame 14, a motor 16 mounted on the blade supporting frame 14 to drive the saw blade 15, a biasing spring 18 disposed to bias the free end of the blade supporting frame 14 away from the worktable 11, and a dust discharging tube 19 disposed on the blade supporting frame 14. In use, a handle 17 mounted on the free end of the blade supporting frame 14 is depressed toward a workpiece (not shown) on the worktable 11 for sawing the same. Wood dust produced during sawing flies into the dust discharging tube 19 so as to be collected therein. However, a large amount of wood dust is not blown into the dust discharging tube 19 and is thus scattered around the saw 10. Furthermore, the circular saw 10 has only a single sawing function.

SUMMARY OF THE INVENTION

The object of the present invention is to provide a circular saw with a dust collecting mechanism which has an increased dust collecting efficiency.

Another object of the present invention is to provide a circular saw which additionally has a grinding function.

According to this invention, the circular saw includes a worktable having front and rear ends opposite to each other in a longitudinal direction, and a blade supporting unit including a pivot end which is pivotally connected to the rear end of the worktable about a pivot axis in a transverse direction relative to the longitudinal direction, a free end which is turnable about the pivot axis to be close to and away from the front end of the worktable, and a middle mounting portion which is interposed between the pivot end and the free end, and which includes right and left support walls spaced apart from each other in the transverse direction. A motor has an output shaft for delivering a driving force. A saw blade shaft is mounted on and is rotatable relative to the left support wall about a blade axis parallel to the pivot axis, and has a driven end driven by the output shaft of the motor, and a coupling end disposed between the right and left support walls. A saw blade is mounted on and is rotated with the coupling end of the saw blade shaft. A driving shaft is mounted on and is rotatable relative to the left support wall about a driving axis parallel to the blade axis, and has a transmitting end driven by the output shaft of the motor, and a driving end which is opposite to the transmitting end along the driving axis and which extends laterally and outwardly of the right support wall. A dust collecting member is disposed between the right and left support walls to confine a dust passageway for collecting wood dust. The passageway has an intake port which is disposed in the vicinity of the saw blade, and an outlet port which is disposed downstream of the intake port and which extends through the right support wall along the driving axis for passage of wood dust. A blower casing is disposed laterally and outwardly of the right support wall, and defines an accommodation chamber which is disposed downstream of the outlet port and which receives the driving end of the driving shaft. The blower casing has a discharge port which extends in a direction radial to the driving axis to be communicated with the accommodation chamber. An impeller is disposed in the accommodation chamber, and is mounted on the driving end of the driving shaft to rotate about the driving axis so as to draw wood dust from the dust passageway into the accommodation chamber and out through the discharge port.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
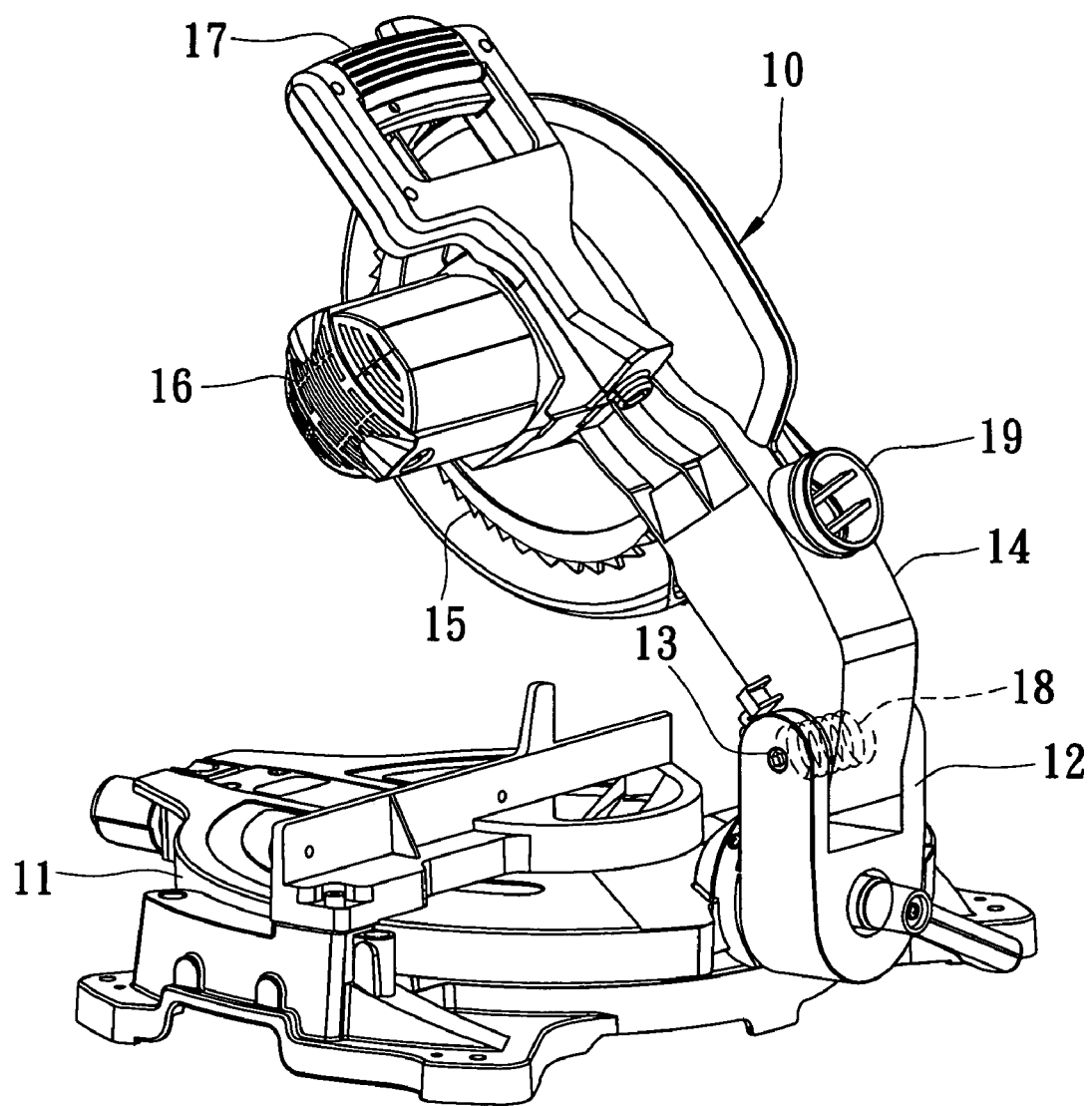
FIG. 1 is a perspective view of a conventional circular saw.

Referring to FIGS. 2 to 6, the preferred embodiment of a circular saw according to the present invention is shown to comprise a worktable 20 having front and rear ends 202,201 opposite to each other in a longitudinal direction, a mounting seat 21 extending from the rear end 201 of the worktable 20 upwardly, a blade supporting unit 30, a driving unit 40, a drive transmission unit 50, a dust collecting unit 60, a grinding unit 70, a damper unit 80, and a blade guarding unit 90.

The mounting seat 21 includes a seat body 22, a pivot shaft 23, and a restricting rod 25. The seat body 22 includes a bottom portion 221, a pair of side plates 222,223 extending upwardly from the bottom portion 221, and a blocking portion 224 interposed between the side plates 222,223. The pivot shaft 23 is secured on top ends of the side plates 222,223, extends along a pivot axis in a transverse direction relative to the longitudinal direction, and has two shaft ends 231,232 extending outwardly of the side plates 222,223, respectively. The restricting rod 25 is secured on the blocking portion 224.

The blade supporting unit 30 includes two pivot ends 311,321 which are sleeved on the pivot shaft 23 and which are pivotally connected to the mounting seat 21 about the pivot axis, two free ends 312,322 which are opposite to the pivot ends 311,321, respectively, and a middle mounting portion which is interposed between the pivot ends 311,321 and the free ends 312,322 and which includes right and left support walls 31,32 spaced apart from each other in the transverse direction by screw fasteners 33 for receiving a circular saw blade 34 therebetween. A handle 35 is secured on the free end 322. During assembly, the pivot ends 311,321 are disposed between the side plates 222,223. A biasing member 24, such as a torsion spring, is disposed between the pivot ends 311,321, and has two ends respectively abutting against a boss 26 on the pivot end 311 and the blocking portion 224. The pivot shaft 23 then passes through the side plates 222,223, the biasing member 24, and the pivot ends 311,321. As such, the free ends 312,322 are turnable about the pivot axis to be close to and away from the front end 202 of the worktable 20. The biasing member 24 can bias the free ends 312,322 to be away from the front end 202 of the worktable 20 so as to urge the saw blade 34 to move away from the worktable 20.

The driving unit 40 includes a mounting plate 41 which is secured on the outer side of the side plate 223, and a motor 42 which is spaced apart from and which is secured to the mounting plate 41 by screw fasteners 43. The motor 42 has an output shaft 421 which extends along an output shaft axis that is parallel to the pivot axis of the pivot shaft 23 to deliver a driving force. In this embodiment, the output shaft axis is aligned with the pivot axis.

A saw blade shaft 54 is mounted on and is rotatable relative to the left support wall 32 by a bearing seat 52 on an outer surface 323 of the left support wall 32 about a blade axis that is parallel to the output shaft axis, and has a driven end 542 which is disposed leftwardly and outwardly of the left support wall 32, and a coupling end 541 which is opposite to the driven end 542 along the blade axis such that the saw blade 34 is mounted on and is rotated with the coupling end 541.

Figure 6:
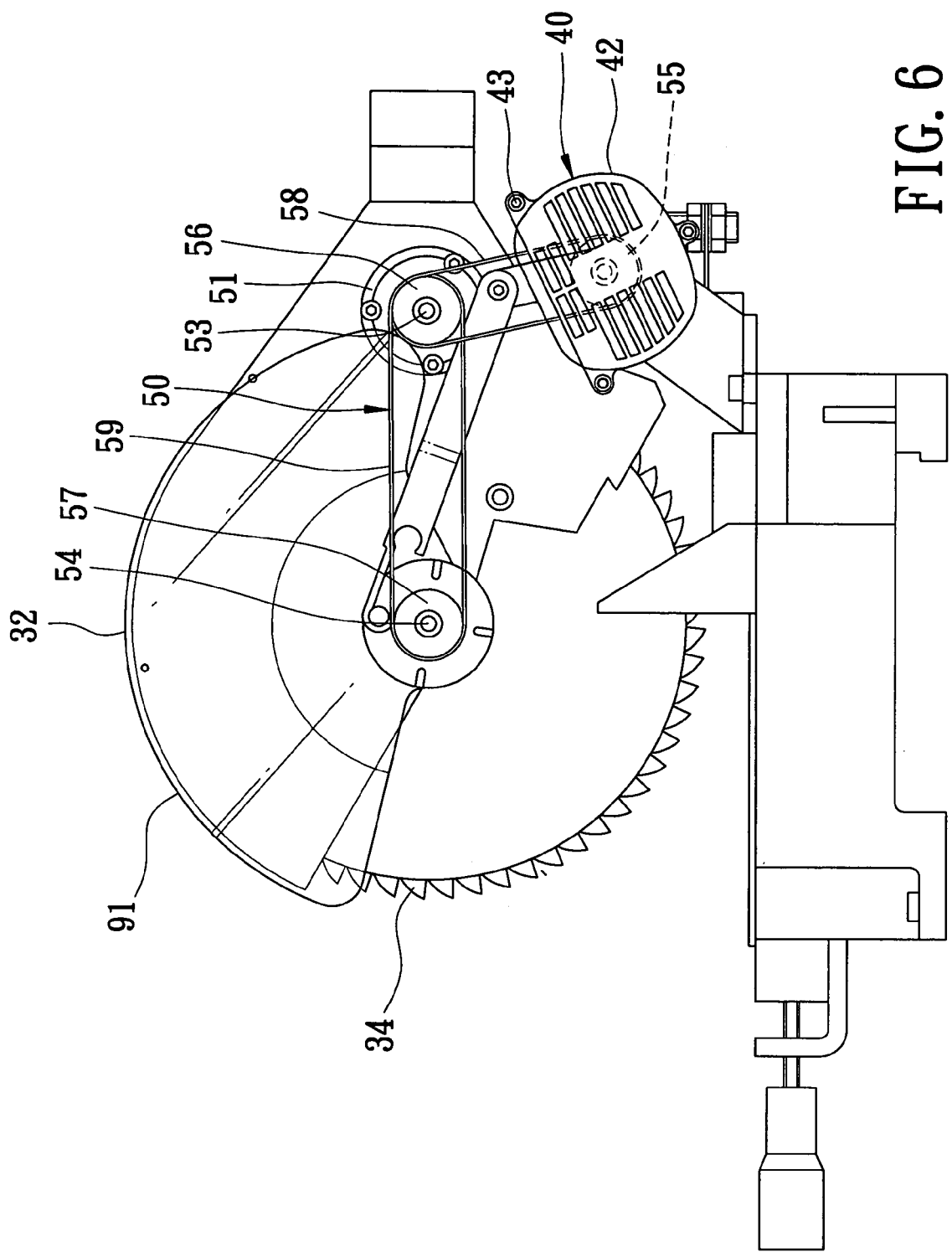
FIG. 6 is a fragmentary left view of the preferred embodiment, showing a drive transmission unit.
Figure 7:
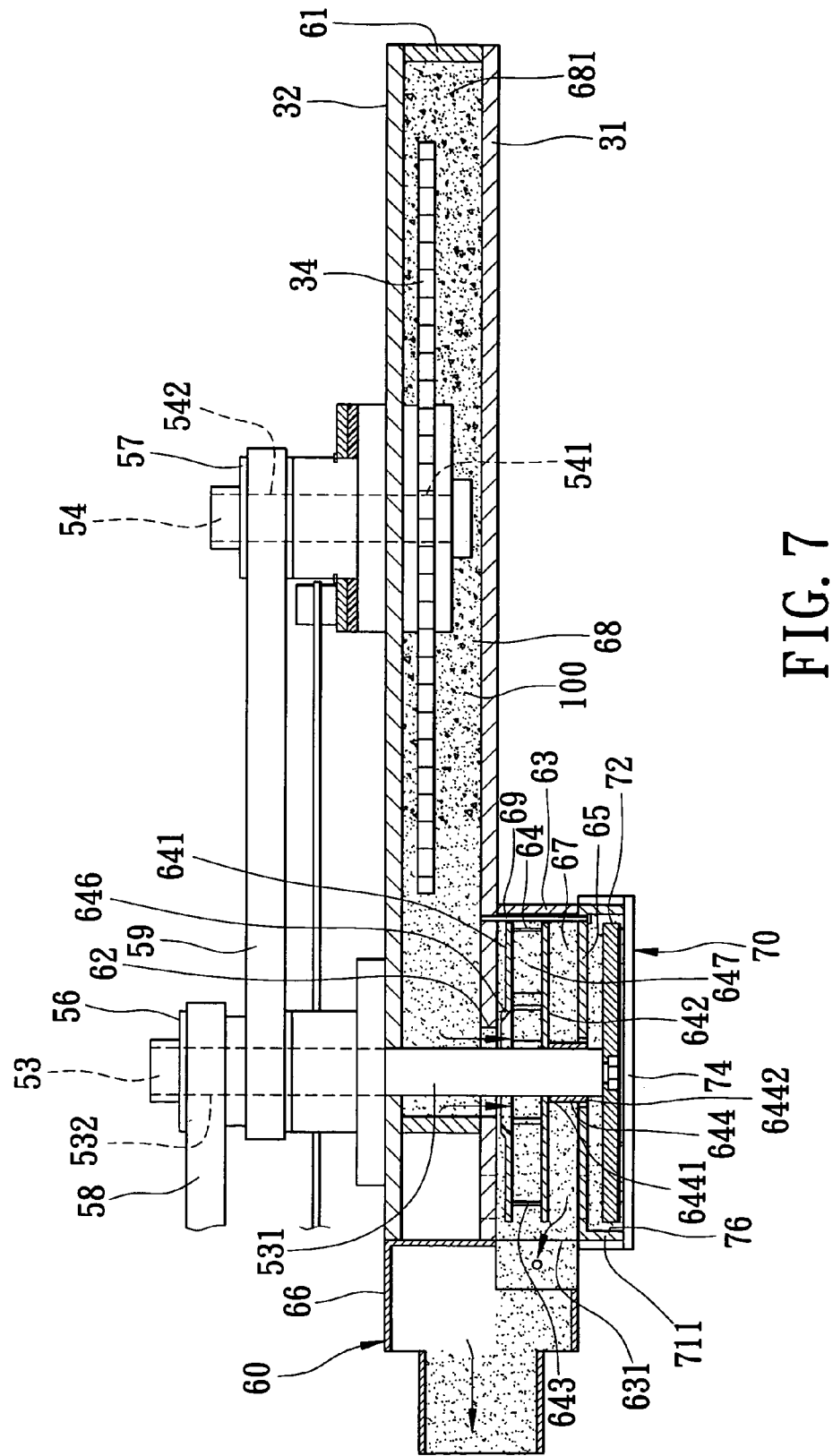
FIG. 7 is a fragmentary sectional view showing how an impeller is operated to draw wood dust produced during sawing operation of a saw blade.
Figure 8:
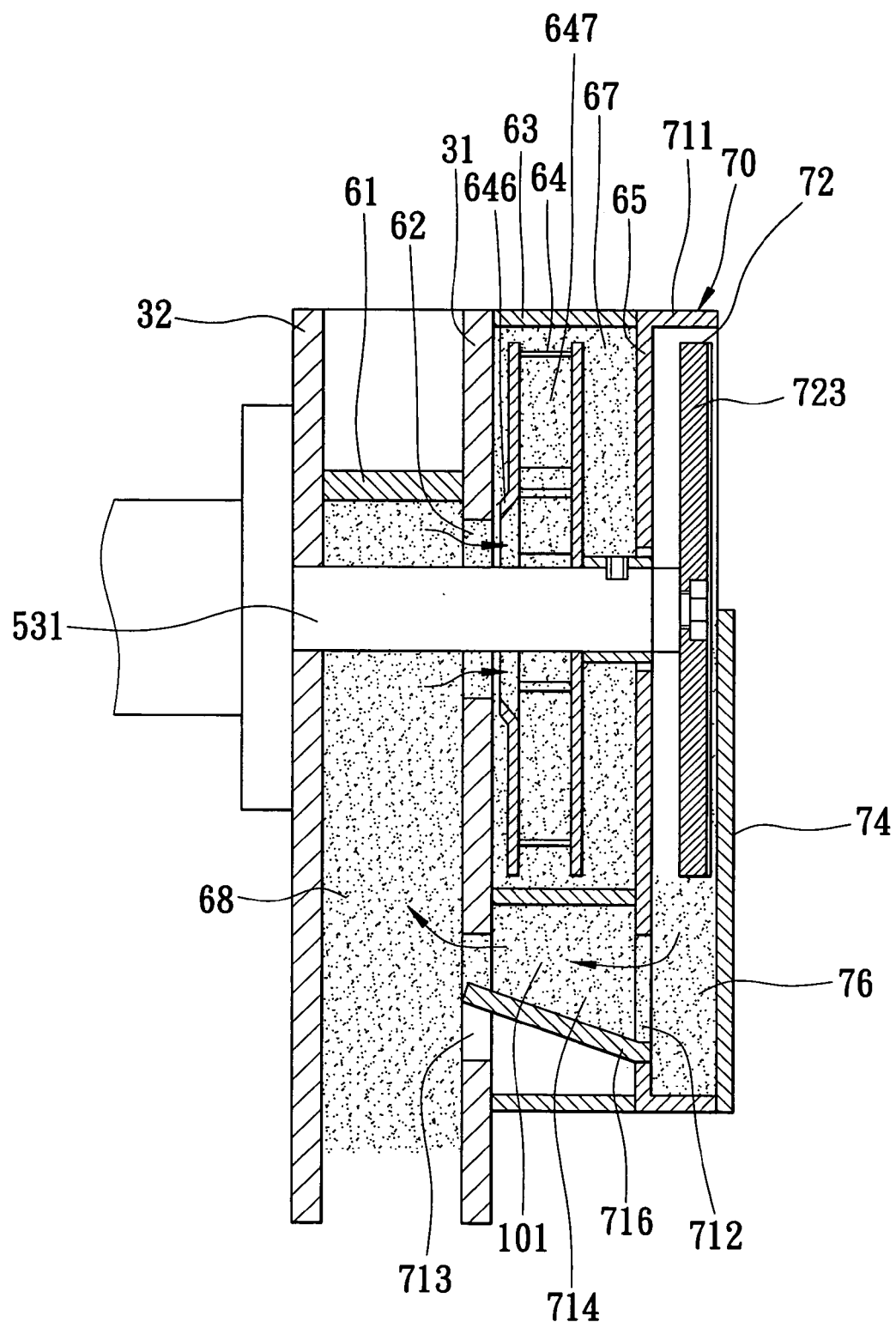
FIG. 8 is a fragmentary sectional view showing how the impeller is operated to draw wood dust produced during grinding operation of a grinding wheel member.

The drive transmission unit 50 includes a driving shaft 53 disposed between the saw blade shaft 54 and the pivot end 321, and a transmitting member. The driving shaft 53 is mounted on and is rotatable relative to the left support wall 32 by a bearing seat 51 on the outer surface 323 of the left support wall 32 about a driving axis that is parallel to the blade axis, and has a transmitting end 532 which is disposed leftwardly and outwardly of the left support wall 32, and a driving end 531 which is opposite to the transmitting end 532 along the driving axis and which extends laterally and outwardly of the right support wall 31. The transmitting end 532 is coupled with a pulley 56. As shown in FIG. 6, a belt 58 is trained on the pulley 56 and a pulley 55 on the output shaft 421 so as to transmit the driving force of the output shaft 421 to rotate the driving shaft 53 about the driving axis. The transmitting member includes a pulley 57 which is coupled with the driven end 542 of the saw blade shaft 54, and a belt 59 which is trained on the pulleys 56,57 such that rotational force of the driving shaft 53 is transmitted to rotate the saw blade shaft 54 about the blade axis, thereby rotating the saw blade 34 for performing a sawing operation. As illustrated, when the motor 42 is actuated, the driving shaft 53, the saw blade shaft 54 and the saw blade 34 are rotated simultaneously.

Referring to FIGS. 2, 4, 7 and 8, the dust collecting unit 60 includes a dust collecting member, a blower casing, and an impeller 64. The dust collecting member includes a barrier plate 61 which is disposed on an inner surface 324 of the left support wall 32 and which extends in the transverse direction and angularly about the blade axis to confine an intake port 681 of a dust passageway 68 such that wood dust 100 that is flung by a centrifugal force generated during operation of the saw blade 34 is deflected by the barrier wall 61 so as to be collected in the dust passageway 68. The dust passageway 68 has an outlet port 62 which extends through the right support wall 31 along the driving axis for passage of the driving end 531 of the driving shaft 53, and which is configured to define an annular outlet hole 62 for receiving the driving end 531 so that the wood dust 100 that is directed by the barrier wall 61 toward the outlet port 62 can be discharged through the annular outlet hole 62.

When the dust collecting unit 60 is turned with the blade supporting unit 30 to a predetermined position, the barrier plate 61 is restricted by the restricting rod 25, thereby positioning the blade supporting unit 30.

The blower casing includes a surrounding casing wall 63 which is secured on and which is disposed rightwardly and outwardly of an outer surface 313 of the right support wall 31 and which surrounds the outlet port 62, and a cover plate 65 which is secured to the surrounding casing wall 63 by fasteners 69 so as to shield the surrounding casing wall 63 and to define an accommodation chamber 67 that is communicated with the dust passageway 68 through the annular outlet hole 62 of the outlet port 62 and that receives a segment of the driving end 531 of the driving shaft 53. The surrounding casing wall 63 defines a discharge port 631 which extends in a direction radial to the driving axis to be communicated with the accommodation chamber 67. A dust discharge coupler 66 is connected to the discharge port 631 for connection with a dust bag 102 (see FIG. 2), thereby facilitating disposal of the wood dust 100.

The impeller 64 is disposed in the accommodation chamber 67, and includes a hub 644 which is secured on the driving end 531 of the driving shaft 53 by a fastener 645 for rotation therewith, and which has proximate and distal ends 6441,6442 opposite to each other and relative to the transmitting end 532 of the driving shaft 53. An end wall 642 extends from the proximate end 6441 of the hub 644 in radial directions. A guiding wall 641 is spaced apart from the end wall 642 along the driving axis so as to define a diverting space 647 therebetween for communication with the discharge port 631, and has an inlet hole 646 which receives the driving end 531 and which is aligned with the outlet port 62 along the driving axis so as to communicate the outlet port 62 with the diverting space 647. A plurality of impeller fins 643 are disposed in the diverting space 647 and are angularly displaced from one another about the driving axis so as to impel the wood dust 100 out of the discharge port 631. Preferably, the inlet hole 646 has an inner diameter which is gradually increased toward the end wall 642, thereby facilitating drawing of the wood dust 100 into the diverting space 647.

Referring to FIGS. 2, 4, 7 and 8, the grinding unit 70 includes a dust guiding member 71, a grinding wheel member 72, and a working table member 73. The dust guiding member 71 includes a surrounding wall 711 secured on and extending rightwardly and outwardly of the cover plate 65, and defining a receiving chamber 76 which permits insertion of a segment of the driving end 531 of the driving shaft 53 that extends rightwardly and outwardly of the distal end 6442 of the hub 644 thereinto. The receiving chamber 76 has a dust guiding port 712 which is formed through the cover plate 65 under the driving end 531 of the driving shaft 53. A protective plate 74 is secured to a lower portion of the surrounding wall 711 by fasteners 75 for covering the same. A dust inlet port 713 is formed and extends through the right support wall 31 to be communicated with the dust passageway 68, and is aligned with the dust guiding port 712 in the transverse direction. A guiding duct 714 is defined by a deflecting plate 716, and is formed between the right support wall 31 and the dust guiding member 71 to communicate the dust guiding port 712 with the dust inlet port 713 such that the dust guiding port 712 is disposed upstream of the dust passageway 68.

The grinding wheel member 72 is disposed in the receiving chamber 76, and includes a grinding wheel 721 which is mounted on and which is rotated with the driving end 531 of the driving shaft 53 about the driving axis, and sandpaper 722 which is attached to an outer surface of the grinding wheel 721 such that an upper running segment 723 of the grinding wheel member 72 is opposite to the dust guiding port 712 relative to the driving axis and is exposed outwardly and upwardly of the protective plate 74 for performing a grinding operation.

The working table member 73 has a connected end 731 sleeved on and angularly adjustable relative to the shaft end 231 of the pivot shaft 23 about the pivot axis, a support post 732 which extends from the connected end 731, a table wall 733 which is connected pivotally to the support post 732 and which is disposed proximate to the grinding wheel member 72 so as to support a workpiece (not shown) to be ground by the grinding wheel member 72, and a bearing plate 734 with an arcuate hole 735 such that a threaded bolt 736 passes through the arcuate hole 735 and engages threadedly the support post 732 so as to enable the bearing plate 734 to retain the table wall 733 relative to the grinding wheel member 72.

As shown in FIGS. 5 to 8, when the motor 42 is actuated, the driving shaft 53 and the saw blade shaft 54 are rotated so as to rotate the saw blade 34, the grinding wheel member 72 and the impeller 64 for performing sawing, grinding and dust collecting operations simultaneously.

During the operation of the saw blade 34, the wood dust 100 which flies into the dust passageway 68 can be drawn into the accommodation chamber 67 through the outlet port 62 and the inlet hole 646 so as to be directed to the discharge port 631 for discharge therefrom. During the operation of the grinding wheel member 72, dust 101 which is flung into the receiving chamber 76 can be directed toward the dust passageway 68 through the guiding duct 714 and to be drawn into the accommodation chamber 67 for discharge through the discharge port 631. Thus, dust 100,101 can be collected in a dust bag 102 connected to the dust discharge coupler 66 for convenient disposal.

Figure 2:
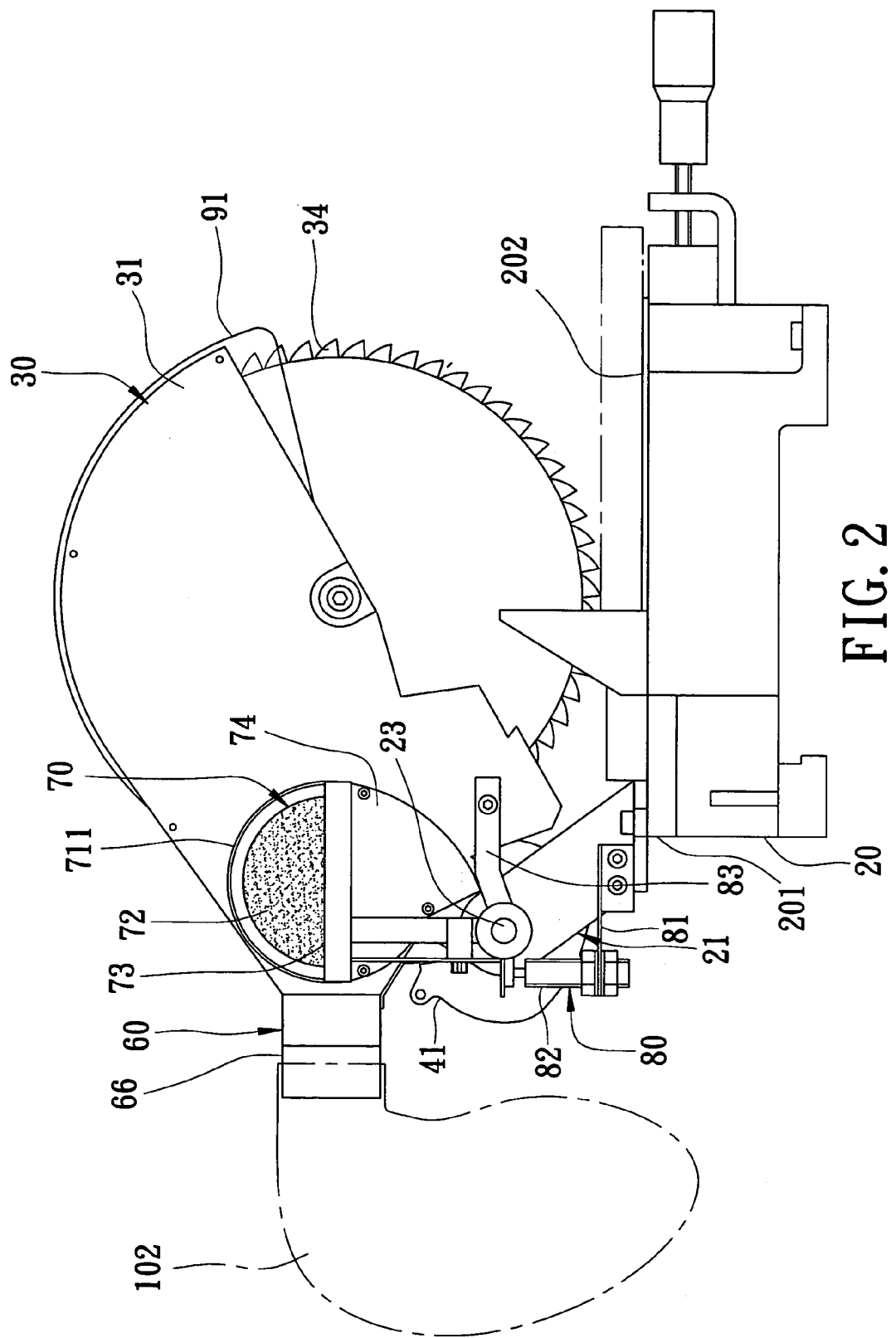
FIG. 2 is a right side schematic view of the preferred embodiment of a circular saw according to this invention.
Figure 4:
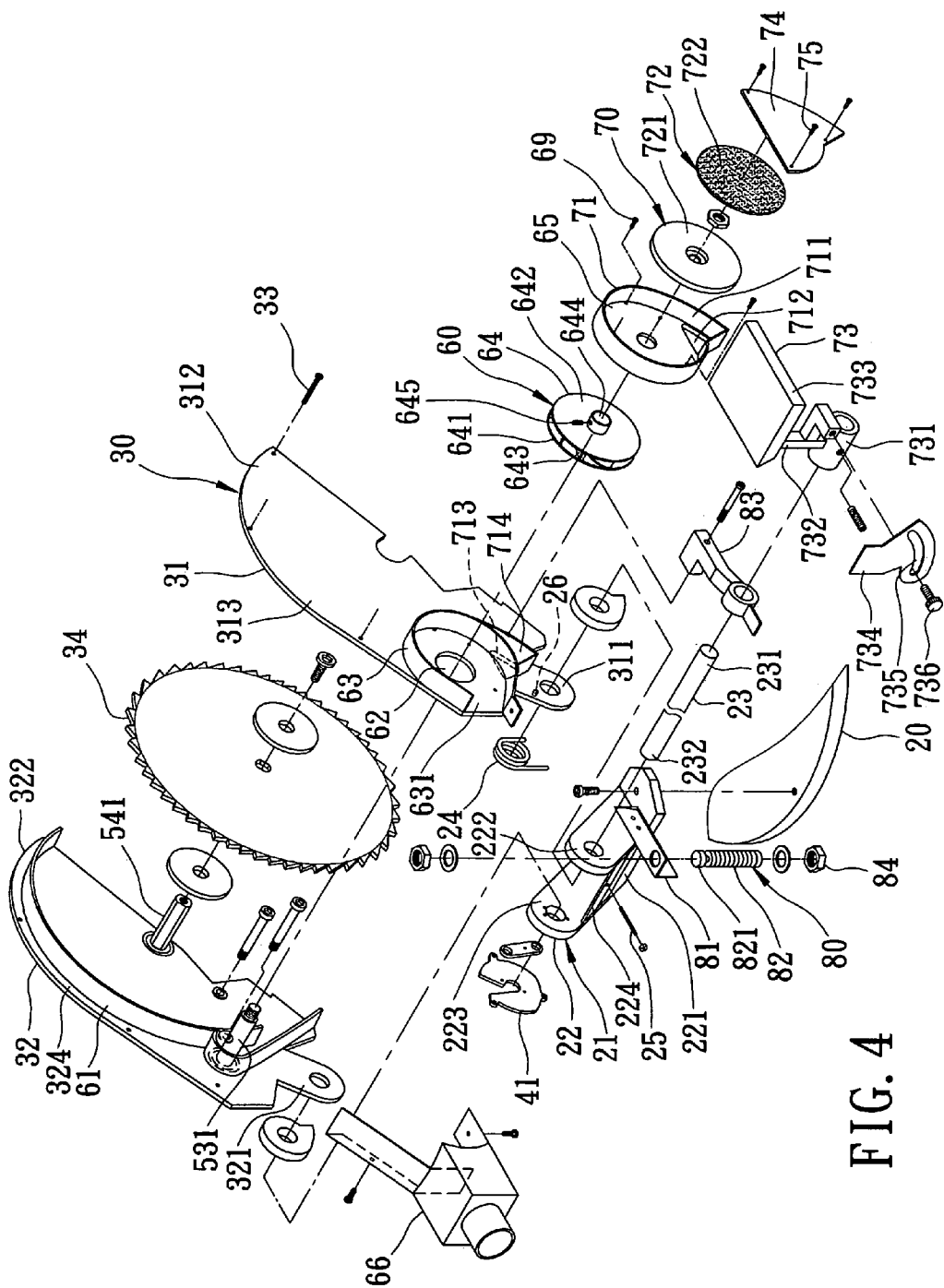
FIG. 4 is an exploded perspective view of a right part of the preferred embodiment.

Referring to FIGS. 2 and 4, the damper unit 80 includes a mounting seat 81 secured to the side plate 222 by fasteners 84, a cushioning member 82 which is secured to the mounting seat 81, and which has an upper depressable end 821, and a coupling lever 83 which is pivotally mounted on the shaft end 231 of the pivot shaft 23 about the pivot axis such that when the free ends 312,322 of the blade supporting unit 30 are turned away from the front end 202 of the worktable 20 by a biasing force of the biasing member 24, the coupling lever 83 can depress the upper depressable end 821 to acquire a cushioning force against the biasing force, thereby preventing abrupt movement of the saw blade 34 away from the worktable 20. Thus, vibration of the blade supporting unit 30 and the saw blade 34 can be prevented.

Figure 3:
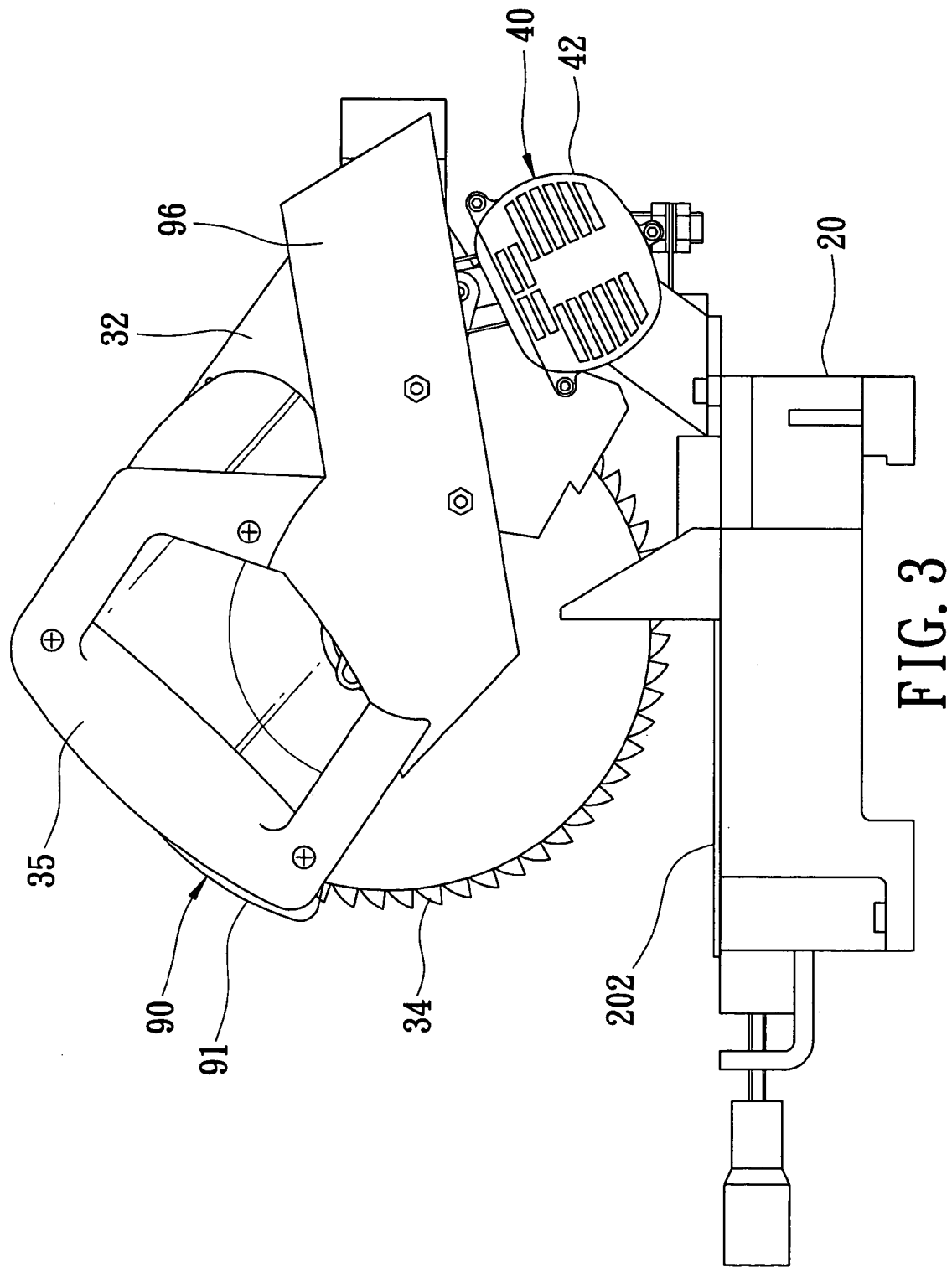
FIG. 3 is a left side schematic view of the preferred embodiment.
Figure 5:
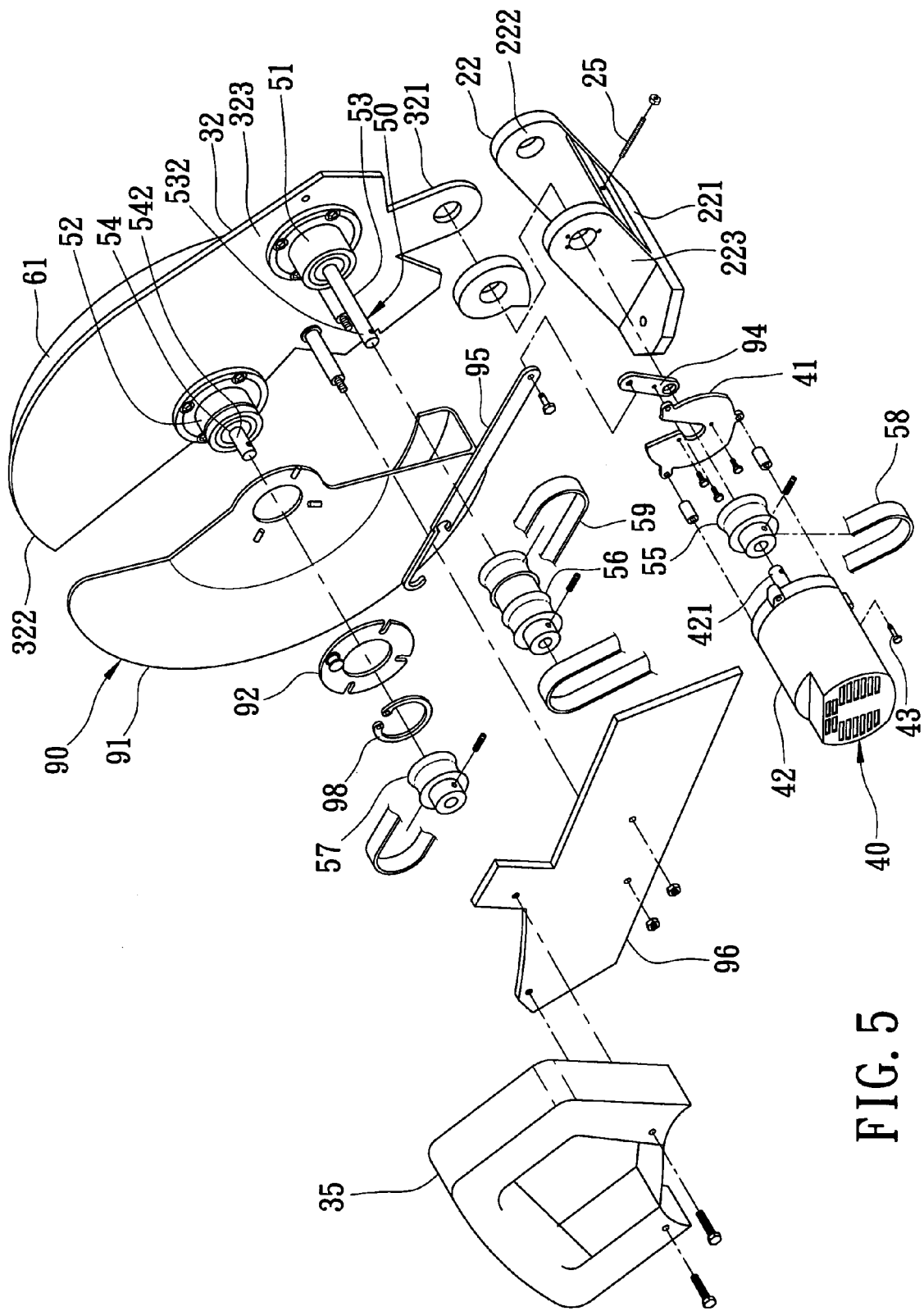
FIG. 5 is an exploded perspective view of a left part of the preferred embodiment.

Referring to FIGS. 2, 3 and 5, the blade guarding unit 90 includes a blade guard 91 which is sleeved on the bearing seat 52 and which is turnable about the blade axis, a rotary plate 92 secured on the blade guard 91, a snap member 98 disposed to prevent removal of the rotary plate 92 and the blade guard 91 from the bearing seat 52, an anchor arm 95 which has an end pivoted to a pivot plate 94 secured on the side plate 223 and an opposite end engaging the rotary plate 92, and a protective plate 96 secured to the left support wall 32 so as to shield the drive transmission unit 50. When the saw blade shaft 54 is moved with the free ends 312,322 of the blade supporting unit 30 to be close to the front end 202 of the worktable 20 for performing the sawing operation (see FIG. 6), the rotary plate 92 is turned by a torque generated as a result of the engagement of the rotary plate 92 with the end of the anchor arm 95, thereby resulting in sweeping of the blade guard 91 from a lower position to an upper position to expose a lower running portion of the saw blade 34.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:
1. A circular saw comprising:
a worktable having front and rear ends opposite to each other in a longitudinal direction;
a blade supporting unit including a pivot end which is pivotally connected to said rear end of said worktable about a pivot axis in a transverse direction relative to the longitudinal direction, a free end which is turnable about the pivot axis to be close to and away from said front end of said worktable, and a middle mounting portion which is interposed between said pivot end and said free end, and which includes right and left support walls spaced apart from each other in the transverse direction;

a motor having an output shaft for delivering a driving force;

a saw blade shaft mounted on and rotatable relative to said left support wall about a blade axis parallel to the pivot axis, and having a driven end driven by said output shaft of said motor, and a coupling end which is disposed between said right and left support walls;

a saw blade mounted on and rotated with said coupling end of said saw blade shaft;

a driving shaft mounted on and rotatable relative to said left support wall about a driving axis parallel to the blade axis, and having a transmitting end which is driven by said output shaft of said motor, and a driving end which is opposite to said transmitting end along the driving axis and which extends laterally and outwardly of said right support wall;

a dust collecting member disposed between said right and left support walls to confine a dust passageway for collecting wood dust, said passageway having an intake port which is disposed in the vicinity of said saw blade, and an outlet port which is disposed downstream of said intake port and which extends through said right support wall along the driving axis for passage of wood dust;

a blower casing disposed laterally and outwardly of said right support wall, and defining an accommodation chamber which is disposed downstream of said outlet port and which receives said driving end of said driving shaft, said blower casing having a discharge port which extends in a direction radial to the driving axis to be communicated with said accommodation chamber; and an impeller disposed in said accommodation chamber, and mounted on said driving end of said driving shaft to rotate about the driving axis so as to draw wood dust from said dust passageway into said accommodation chamber and out through said discharge port.

2. The circular saw of claim 1, wherein said driving end of said driving shaft passes through said outlet port, said outlet port being configured to define an annular outlet hole that receives said driving end for communicating said dust passageway with said accommodation chamber, said blower casing being disposed on said right support wall and rightwardly of said outlet port.

3. The circular saw of claim 2, wherein said driving shaft is disposed between said pivot end and said saw blade shaft, said dust collecting member including a barrier wall which is disposed on said left support wall and which extends in the transverse direction and angularly about the blade axis to define said intake port such that the wood dust which is flung by a centrifugal force generated during a sawing operation of said saw blade is deflected by said barrier wall so as to be directed towards said outlet port.

4. The circular saw of claim 3, wherein said impeller includes a hub which is mounted on and which is rotated with said driving end of said driving shaft, and which has proximate and distal ends opposite to each other and relative to said transmitting end of said driving shaft, an end wall extending from said proximate end in radial directions, a guiding wall which is spaced apart from said end wall along the driving axis so as to define a diverting space that is communicated with said discharge port, and which has an inlet hole to receive said driving end and to communicate said outlet port with said diverting space, and a plurality of impeller fins disposed in said diverting space and angularly displaced from one another about the driving axis so as to impel the wood dust out of said discharge port.

5. The circular saw of claim 4, wherein said inlet hole is aligned with said outlet port along the driving axis and has an inner diameter that is gradually increased toward said end wall, thereby facilitating drawing of the wood dust into said diverting space.

6. The circular saw of claim 5, wherein said driving end of said driving shaft extends rightwardly and outwardly of said distal end of said hub, said circular saw further comprising a grinding unit which includes:

a dust guiding member secured on and disposed rightwardly and outwardly of said blower casing, and defining a receiving chamber which permits insertion of said driving end of said driving shaft thereinto, said receiving chamber having a dust guiding port which is disposed upstream of said dust passageway, a grinding wheel member which is disposed in said receiving chamber, which is mounted on said driving end of said driving shaft to rotate about the driving axis, and which has an upper running segment that is exposed outwardly and upwardly of said dust guiding member for performing a grinding operation, and that is opposite to said dust guiding port relative to the driving axis, and a working table member having a table wall which is disposed proximate to said grinding wheel member so as to support a workpiece to be ground by said grinding wheel member.

7. The circular saw of claim 6, wherein said dust guiding member has an dust inlet port which extends through said right support wall to be communicated with said dust passageway and which is aligned with said dust guiding port in the transverse direction, and a guiding duct which is formed between said right support wall and said dust guiding member, and which is configured to communicate said dust guiding port with said dust inlet port so as to guide wood dust produced during grinding toward said dust passageway.

* * * * *